United States Patent
Hasegawa et al.

(10) Patent No.: US 9,319,888 B2
(45) Date of Patent: Apr. 19, 2016

(54) SYSTEM AND METHOD FOR SELECTING UNLICENSED FREQUENCY BAND USING HYBRID TDD AND FDD

(75) Inventors: Keigo Hasegawa, Tokyo (JP); Masayuki Takekawa, Tokyo (JP); Keat Beng Toh, Tokyo (JP)

(73) Assignee: HITACHI KOKUSAI ELECTRIC, INC., Tokyo (JP)

( * ) Notice: Subject to any disclaimer, the term of this patent is extended or adjusted under 35 U.S.C. 154(b) by 94 days.

(21) Appl. No.: 14/123,843

(22) PCT Filed: Aug. 6, 2012

(86) PCT No.: PCT/JP2012/064793
§ 371 (c)(1),
(2), (4) Date: Dec. 4, 2013

(87) PCT Pub. No.: WO2012/176632
PCT Pub. Date: Dec. 27, 2012

(65) Prior Publication Data
US 2014/0112215 A1 Apr. 24, 2014

(30) Foreign Application Priority Data
Jun. 20, 2011 (JP) ................................ 2011-136709

(51) Int. Cl.
*H04W 16/14* (2009.01)
*H04W 72/08* (2009.01)
*H04W 72/04* (2009.01)

(52) U.S. Cl.
CPC ............ *H04W 16/14* (2013.01); *H04W 72/085* (2013.01); *H04W 72/087* (2013.01); *H04W 72/0453* (2013.01)

(58) Field of Classification Search
None
See application file for complete search history.

(56) References Cited

U.S. PATENT DOCUMENTS

| 2008/0304404 A1* | 12/2008 | Lu et al. ................. 370/210 |
| 2009/0075660 A1* | 3/2009 | Hallenstal ........... H04L 63/0272 455/437 |

(Continued)

FOREIGN PATENT DOCUMENTS

| EP | 2317812 A1 | 5/2011 |
| JP | 2010-136291 A | 6/2010 |
| WO | 2010-067773 A1 | 6/2010 |

OTHER PUBLICATIONS

Name of the Authors: Toshifumi Nakamura, Hiroto Sugahara, Kazushi Muraoka, Masayuki Ariyoshi, Title of the Article: Site Specific Interference Estimation for Advanced Spectrum Management in Cognitive Radio Systems over White Space Spectrum; Pub—The Institute of Electronics, Information and Comm Engineers Title of the item: Technical Report; Oct. 2010, Pages: Total 8 pages.

(Continued)

*Primary Examiner* — Brandon Renner
*Assistant Examiner* — Deepa Belur
(74) *Attorney, Agent, or Firm* — Brundidge & Stanger, P.C.

(57) ABSTRACT

A technique for enabling utilization of a one-way link in wireless communication systems of the type using whitespaces is disclosed. A wireless communication system is arranged to include a transmitting station which transmits data by wireless communication and receiving stations which receive data as sent thereto, for performing wireless communication by using a whitespace. The receiving station detects data receivability at a specific frequency and sends communication quality information which is a detection result thereof to the transmitting station. The transmitting station holds this communication quality information. Then, upon startup of data reception by wireless communication, the receiving station sends to the transmitting station a packet indicating required quality which is a condition for the data reception. The transmitting station selects, by reference to the communication quality information, a frequency satisfying this required quality and allocates it to the receiving station as a frequency used for data transmission.

12 Claims, 6 Drawing Sheets

(56) References Cited

U.S. PATENT DOCUMENTS

| | | | |
|---|---|---|---|
| 2010/0246506 A1* | 9/2010 | Krishnaswamy | H04W 72/085 370/329 |
| 2011/0176445 A1* | 7/2011 | Chen | 370/252 |
| 2013/0155991 A1* | 6/2013 | Kazmi et al. | 370/329 |
| 2013/0182660 A1* | 7/2013 | Takekawa et al. | 370/329 |
| 2013/0329692 A1* | 12/2013 | Vrzic et al. | 370/329 |

OTHER PUBLICATIONS

Name of the Authors: the IEEE 802.22 Working Group of the LAN/Man Standards Committee, Title of the Article: IEEE 802.22/P802.22/D3.0, Mar. 2011 Draft Standard for Wireless Regional Area Networks Part 22: Cognitive Wireless RAN Medium Access Control (MAC) and Physical Layer (PHY) specifications: Policies and procedures for operation in the TV Bands, Pages: Total 662 pages.

* cited by examiner

SYSTEM AND METHOD FOR SELECTING UNLICENSED FREQUENCY BAND USING HYBRID TDD AND FDD

BACKGROUND OF THE INVENTION

The present invention relates to wireless communication systems of the type using whitespaces, and more particularly to methodology for allocating a frequency to be used.

With remarkable advances in information technology (IT) society in recent years, wireless communication other than wired communication is widely used as a communication method for use in many IT devices and services. This leads to a continuous increase in demand for radio spectrum which is a limited resource, resulting in creation of a big problem— that is, use-up or "depletion" of assignable frequencies in countries all around the world. In general, radio spectrum is license-managed by a country to make sure that only a licensed person is granted to use spectrum under strict control in a specific geometric location at specific time. However, in order to meet ever-increasing frequency demands, it is desired to contrive a new spectrum-using method that breaks through the concepts of conventional utilization methods.

Consequently in recent years, there has been studied as such new spectrum use method for solving the spectrum depletion problem a method of utilizing certain frequency bandwidths (whitespaces) that remain unused in terms of space and time in spite of the fact that these have already been allocated. For example, research is conducted to develop the so-called cognitive wireless communications system which sufficiently avoids the influence on spectrum usage of incumbent systems of licensed users (referred to hereinafter as primary users) and, simultaneously, permits unlicensed users (referred to as secondary users) to flexibly utilize radio waves of whitespaces. Teachings as to this system are found, for example, in H. Fujii, "Cognitive Radio: Core Technology of White Space Utilization for Avoiding Waste of Radio_ wave Usage," [online], RIC TELECOM, (Searched on Jun. 9, 2011), Internet (URL: http://businessnetwork.jp/tabid/65/artid/110/page/1/Default.aspx).

In one exemplary wireless communication system that uses whitespaces in a way compliant with the IEEE 802.22 standard, each wireless station provides access to a database on IP network to thereby acquire both maximal transmission-capable electrical power and a list of transmittable frequencies based on its own position information. The transmittable frequency list is centrally managed, with opportunistic updating, by a spectrum manager (SM) in a base station (BS) which is connected to customer premises equipment (CPE), such as per-house installed substations, mobile/cellular telephone handsets and others. Based on this transmittable frequency channel list, the BS specifies a frequency utilizable for bidirectional communications between BS and CPE and selects it to be a use frequency.

Respective wireless stations (i.e., BS and CPE; the same goes for those indicated below) have spectrum sensing functions. When each wireless station detects that the use frequency which was selected by the spectrum sensing is currently used by an incumbent system (i.e., the primary system/primary user's system), it notifies the SM of the information showing this fact. In responding thereto, SM excludes this frequency from the transmittable frequency list. In this way, the wireless communication system using whitespace performs dynamic spectrum access based on such momentarily updated information, thereby establishing communications between secondary users while at the same time avoiding the influence on the primary user's spectrum usage.

Incidentally, the IEEE 802.22 standard defines only the time division duplex (TDD) as duplex communication scheme. Although BS and CPE use the same frequency in data transmission events and perform communications at different transmission timings to thereby realize two-way communications. However, a duplex communication method relying on the TDD only uses the same frequency for two-way communications. Thus, it is hard to say that the TDD is always an effective communication method for the whitespace-use wireless communication system, which will possibly be encountered with cases where the transmittable frequency differs per wireless station and where maximum transmittable electric power is different. For example, in a case where a wireless station at one end of a communication channel is able to perform high-power transmission at a frequency whereas its associated wireless station at the other end of channel can merely perform low-power transmission at such the frequency, two-way communication quality becomes asymmetrical. Thus, allocating such frequency makes it difficult to perform communications effectively.

Alternatively, in case one wireless station is able to transmit data at a frequency whereas the other wireless station is unable to perform transmission at this frequency, communication therebetween becomes a one-way link which can merely perform data transmission/reception in only one direction, i.e., simplex communication. Obviously, such frequency is unusable in TDD of IEEE 802.22.

SUMMARY OF THE INVENTION

However, from a viewpoint of improvement in spectral efficiency, there is also a case where it is better to use even a frequency which causes communication to become a one-way link. Unfortunately, IEEE 802.22 defines only the TDD as duplex communication scheme; so, the one-way link communication is out of the IEEE 802.22 standard.

Note here that IEEE 802.22 permits the use of an index which affects the communication quality upon determination of a frequency to be used, examples of which index are interference power and spectrum occupancy patterns of the primary user's incumbent system. However, IEEE 802.22 is silent about what kind of index is to be used and how it should be used in practical implementation.

In light of the technical background stated supra, it is an object of this invention to enable, in a wireless communication system of the type using whitespaces, achievement of effective frequency allocation by utilizing any frequency even where the use of it results in one-way link.

To attain the foregoing object, according to an aspect of the present invention, a wireless communication system is provided, including a transmitting station (base station) which transmits data by wireless communication and a receiving station (terminal) which receives the data, for performing the wireless communication by using a whitespace, wherein the receiving station comprises a communication quality estimating unit for detecting possibility of data reception at a specific frequency (channel), a communication quality information transmission unit for transmitting to the transmitting station communication quality information which is a detection result of the communication quality estimating unit, and a required quality transmission unit for transmitting, upon start-up of data reception by the wireless communication, required quality which is a condition for the data reception to the transmitting station, and wherein the transmitting station comprises a communication quality information retention unit for receiving and retaining therein the communication quality information, a required quality reception unit for receiving the required quality from the receiving station, a frequency allocation processing unit for determining a frequency satisfying the required quality by reference to the communication quality information and for allocating this frequency as a frequency used for data transmission to the receiving station, and an allocation result transmission unit for transmitting to the receiving station an allocation result obtained at the frequency allocation processing unit.

In another aspect of the invention, the transmitting station and the receiving station are base station and terminal respectively and carry out bidirectional communication therebetween. At that time, the frequency and timing for upstream (transmission by the terminal to the base station) are determined by the base station without limitation to frequencies assigned to the downlink in the manner described above, so as to avoid interfering and being interfered, and therefore, the system becomes operational in half FDD mode. Further, use of such the frequency only usable in one-way link with other frequencies used in TDD in binding manner (channel aggregation) brings effective utilization of frequencies in accordance with the asymmetry of the downward and upward traffic.

With the above-stated arrangement, it is possible in the whitespace-using wireless communication system to utilize a one-way link (half FDD) to thereby improve the frequency use efficiency, which leads to achievement of effective usage of frequency resources of the whole system.

The present invention is suitable for wireless access system involving a risk of interfering with or being interfered that is caused by sharing the frequency band and also applicable to IEEE802.22 or any other wireless communication systems and broadcasting system using TV white space such as ECMA-392 or IEEE802.11af.

DETAILED DESCRIPTION OF THE PREFERRED EMBODIMENTS

Figure 1:
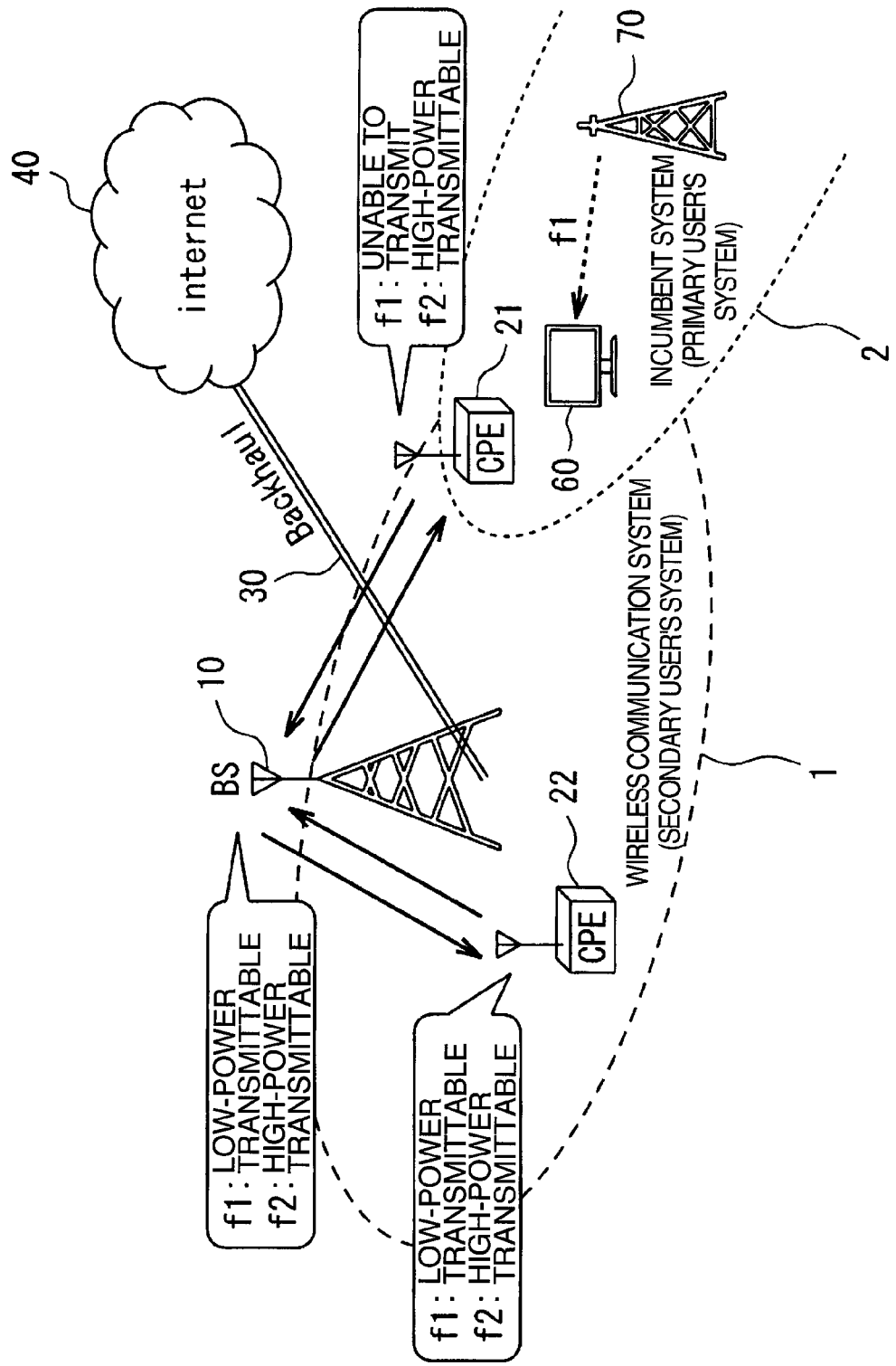
FIG. 1 is a schematic illustration of an entire configuration of a wireless communication system in accordance with one embodiment of this invention.

Currently preferred embodiments of this invention will be described with reference to the accompanying drawings below. It is noted that in the description below, similar parts or components illustrated in respective drawings are indicated by the same reference characters.

(Overview of Radio Communication System)

FIG. 1 is a diagram showing one example of an overall configuration of a wireless communication system in accordance with one embodiment of this invention. This embodiment system is a wireless communication system 1 (or the secondary user's system) of the type utilizing whitespaces.

As shown in FIG. 1, the wireless communication system 1 is arranged to include wireless communication terminals—here, customer premises equipment (CPE) 21 and CPE 22, such as per-house installed substations, mobile telephone handsets, and other similar devices—and also include a base station (BS) 10 connected to these wireless communication terminals, a back-haul line 30 and Internet 40.

A communication system 2 (referred to as "incumbent system" hereinafter) of a primary user who is given a spectrum usage license from his or her country is arranged to include a transmission station 70 and a reception station 60. The primary user of the incumbent system 2 is licensed to use a frequency f1 from the country. The description below assumes that in the wireless communication system 1, a secondary user who is given no license to use the frequency f1 from the country attempts to utilize the frequency f1 as a whitespace.

As shown in FIG. 1, the CPE 21 exists at a geometric location which is physically near the incumbent system 2 in the wireless communication system 1 an attempt to perform data transmission using the frequency f1 would result in generation of interference against the incumbent system 2. Accordingly, it is judged that the frequency f1 is unusable as a whitespace. However, the BS 10 and CPE 22 are at geo-locations far from the incumbent system 2; so, it is possible by sufficiently lessening transmission power to perform communications without having to cause interference to the incumbent system 2 even when each of them performs transmission using the frequency f1. On the other hand, regarding a frequency f2, every wireless station of the wireless communication system 1 is capable of performing data transmission with high power because any incumbent systems using the frequency f2 do not exist at nearby locations of the wireless communication system 1.

(Configuration of Radio Communication System)

Figure 2:
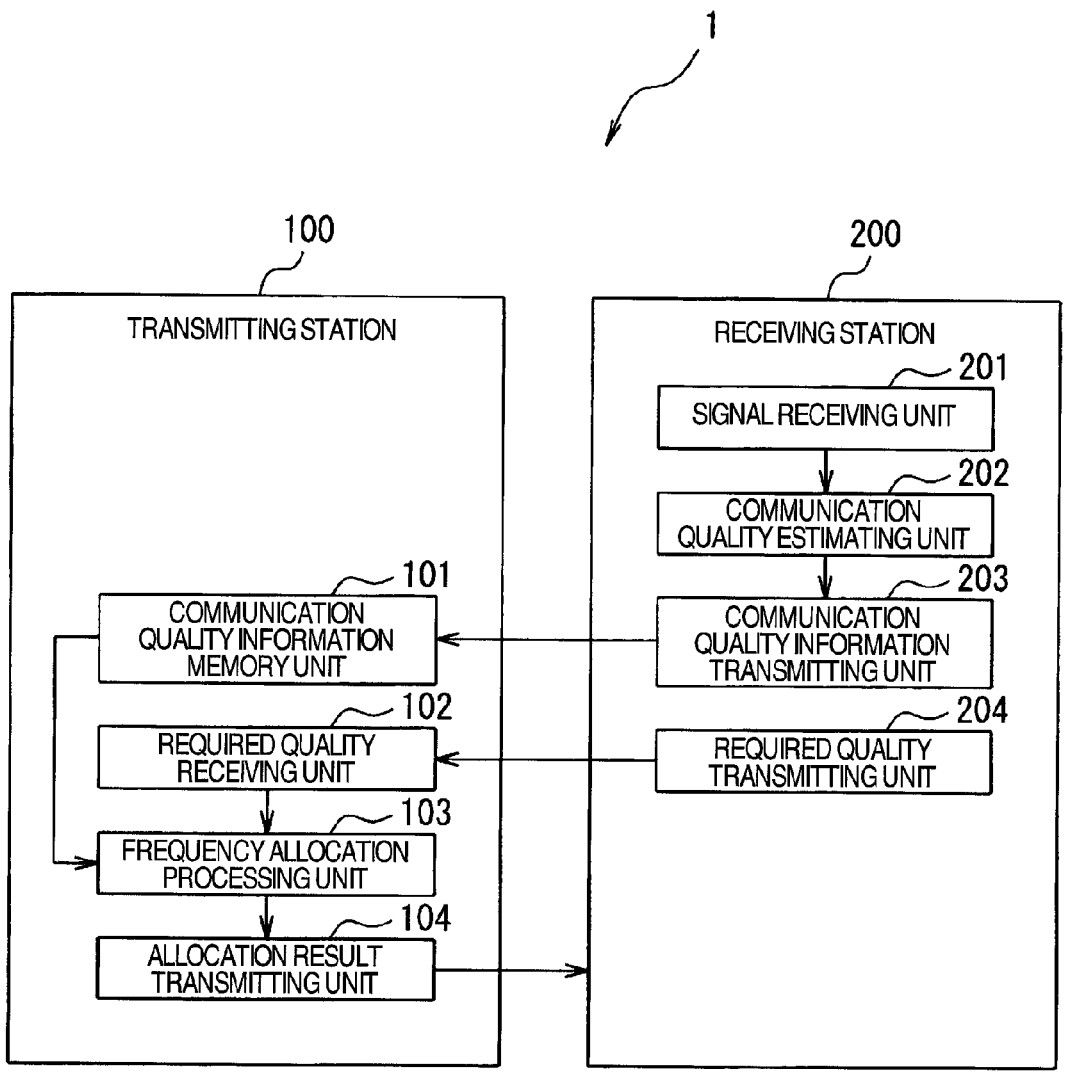
FIG. 2 is a block diagram showing of the wireless communication system.

FIG. 2 is a diagram showing an exemplary configuration of the wireless communication system 1 in accordance with one embodiment of this invention. The wireless communication system 1 is arranged to include a transmitting station 100 for transmitting data by wireless communication and a receiving station 200 for receiving data as sent from the transmitting station 100. In this embodiment, the transmitting station 100 corresponds to the BS 10 shown in FIG. 1 whereas the receiving station 200 corresponds to the CPE 21, 22 of FIG. 1 (BS 10 is the data transmission side, and CPE 21, 22 is the data reception side). Two or more receiving stations may be provided, each of which is similar or equivalent in function to the receiving station 200.

Additionally, in a case where the transmitting station 100 is the CPE 21 or CPE 22 of FIG. 1 whereas the receiving station 200 is BS 10 of FIG. 1, that is, in case the CPE 21, 22 is the data transmission side and BS 10 is data reception side also, practical implementation is realizable by use of a similar configuration to the configuration as will be set forth below.

An explanation will now be given of configurations of the transmitting station 100 and receiving station 200 with reference to FIG. 2. Note that the receiving station 200 will first be described for purposes of convenience in explanation.

(Receiver Station 200)

The receiving station 200 includes a signal receiving unit 201, communication quality estimating unit 202, communication quality information transmission unit 203, and required quality transmission unit 204.

The signal receiving unit 201 receives a signal for estimation of the quality upon reception of data at a specific frequency. In this embodiment, the signal received by the signal receiving unit 201 is a test signal which is periodically sent from the BS 10 to CPE 21, 22. Note however that this is not to be construed as limiting the invention. In other words, the estimation based on reception of a test signal exclusively used for communication quality estimation may be replaced with other approaches—for example, estimation based on reception of a control signal (e.g., beacon) or a broadcast data signal or estimation by interception of a unicast data signal being sent to other stations.

The communication quality estimating unit 202 uses the signal received by the signal receiving unit 201 to detect whether data reception at a specific frequency is executable or not. In this embodiment, the communication quality estimating unit 202 also functions to estimate the communication quality upon reception of data at a specific frequency. In this embodiment the communication quality information is the one that indicates communication-capable maximum data rate in the event of receiving data at the specific frequency, although this is not to be construed as limiting the invention. For example, this may alternatively be a signal to interference-and-noise power ratio (SINR), bit error rate (BER), packet error rate (PER) or else. A further alternative value may also be used, which is obtained by quantizing and encoding any one of them.

To be more precise, the communication quality estimating unit 202 determines or "judges" the communication quality in a way which follows. The estimator 202 demodulates and decodes the received signal after equalizing process and Interference removal, and, in cases where no errors are found by error detection coding, such as cyclic redundancy check (CRC) coding, it may be determined that data is receivable. Alternatively, a predetermined signal, such as a pilot signal involved in each signal at its head part, is used to estimate the SINR and, in case SINR is greater than or equal to a threshold value, it may be judged that the data is receivable. Still alternatively, an SINR estimation result and/or a track record of bit error rate is held for a predetermined length of time period, and an average value thereof may be used for the receivability judgment. Furthermore, it is also possible to employ a method including the steps of providing a plurality of threshold values and defining an index of communication quality on a per-threshold basis or a method having the steps of pre-storing a table, introducing the communication-capable maximum data rate by reference to the table, and defining this rate as the communication quality.

The communication quality information transmission unit 203 transmits communication quality information, which is an estimation result of the communication quality estimating unit 202. Optionally, at this time, the unit may be arranged to transmit, along with the communication quality information, information of the frequency used for the estimation of communication quality.

In this embodiment, the communication quality information transmission unit 203 also functions to transmit information as to communication quality upon reception of data at the specific frequency that was selected by the communication quality estimating unit 202. Note that in this embodiment, the communication quality information is the one that indicates the maximum data rate of data capable of being received at the specific frequency.

The required quality transmission unit 204 transmits data indicative of required quality which is a condition for data reception at the time of start-up of data reception by wireless communication. In this embodiment, the required quality is the one that indicates a required data rate depending on traffic, although this is not to be construed as limiting the invention. For example, it may be replaced with SINR, BER, PER or else. A value obtained by quantizing and coding them may also be used when the need arises.

(Transmitter Station 100)

The transmitting station 100 has a communication quality information memory unit 101, required quality receiving unit 102, frequency allocation processing unit 103 and allocation result transmitting unit 104.

The communication quality information memory unit 101 receives the communication quality information to be sent from the receiving station 200 and retains it therein. More specifically, for example, the communication quality information memory unit 101 retains the communication quality information by storing it along with identifiers for identifying respective ones of a plurality of incumbent receiving stations 200 in a storage device as built in the station of itself, such as hard disk drive (HDD) or else, in the form of a database which associates the information with the identifiers. Alternatively, the communication quality information may be held in a manner that information of the frequency used for communication quality determination is also associated therewith.

The required quality receiving unit 102 receives the required quality to be sent from the receiving station 200. As previously stated, in this embodiment, the required quality is the one that indicates a required data rate pursuant to the traffic.

The frequency allocation processing unit 103 selects a frequency satisfying the required quality received by the required quality receiving 102 by reference to the communication quality information being held in the communication quality information memory unit 101 and then allocates this frequency as the frequency used for data transmission to the receiving station 200. More precisely, for example, the frequency allocation processing unit 103 performs the frequency allocation in a way as will be set forth below.

Upon reception of the required quality, the required quality receiving 102 also receives, in addition thereto, an identifier for identification of the receiving station 200 that has sent the required quality information. Then, communication quality information associated with this identifier is extracted from the communication quality information saved in the communication quality information memory unit 101. Thereafter, the extracted communication quality information is compared with the received required quality to perform frequency allocation with respect to the receiving station 200 in a manner such that the communication quality information satisfies the required quality.

The allocation result transmitting unit 104 transmits to the receiving station 200 the allocation result of the frequency allocation processing unit 103.

(Internal Configuration of BS 10)

A practically implemented configuration of the BS 10 will be explained with reference to FIG. 3 below. Note here that in this embodiment, BS 10 corresponds to the transmitting station 100 stated supra.

Figure 3:
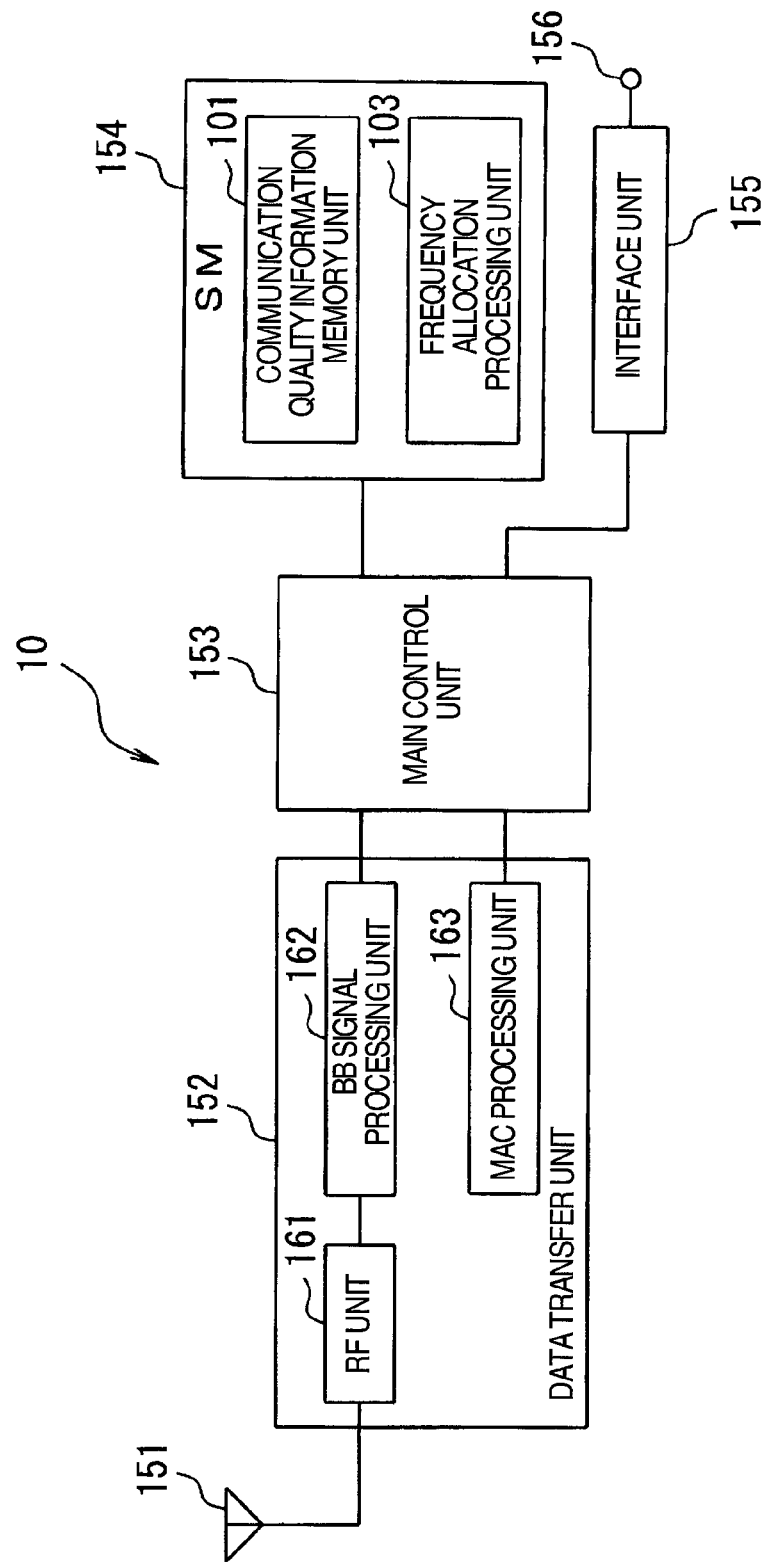
FIG. 3 is a diagram showing a configuration of a base station (BS) of the wireless communication system.

As shown in FIG. 3, the BS 10 includes an antenna 151 for transmission and reception of radio waves, a data transfer unit (DTU) 152 which performs data transmission/reception, a main control unit 153 which performs control of an entirety of the BS 10, a spectrum manager (SM) 154 for managing usable frequencies of CPE 21 and CPE 22, an interface unit 155 functioning to interface BS 10 with back-haul line 30 and external devices, and a terminal 156 for connection with the backhaul line 30 and external devices.

The SM 154 has the above-stated communication quality information memory unit 101 and frequency allocation processing unit 103. That is to say, SM 154 holds the communication quality information of each receiving station 200 and performs frequency allocation in response to issuance of a frequency allocation request from the receiving station 200.

The DTU 152 has a radio frequency (RF) unit 161, baseband (BB) signal processing unit 162, and media access control (MAC) processing unit 163.

The RF unit 161 performs processing operations, such as frequency conversion of downlink and uplink signal from baseband frequency into RF bandwidth and vice versa, and signal amplification.

The BB signal processing unit 162 performs encoding and decoding by error correction code (ECC), modulation and demodulation processing operations.

The MAC processing unit 163 performs processing operations, such as timing control of data transmission/reception and a frequency channel to be used by the BS 10 per se, adding this BS's identifier to packets, and recognition of a wireless device acting as the data transmission source.

The above-stated functions of required quality receiving 102 and allocation result transmitting unit 104 are realized by letting the DTU 152 receive the required quality and transmit the allocation result via the Tx/Rx antenna 151 under control of the main control unit 153.

Note here that the main control unit 153 is configurable, for example, by software and data storage areas defined on a micro-processing unit (MPU) and memory. The processing functions of BB signal processing unit 162, MAC processing unit 163 and SM 154 are realizable, for example, by the MPU of main control unit 153 which reads a program being stored in data storage device, such as HDD, into the memory and then executes the program.

(Internal Configuration of CPE 21, 22)

An explanation will be given of a practically implemented configuration of the CPE 21, 22 with reference to FIG. 4 below. Note that in this embodiment, CPE 21, 22 corresponds to the receiving station 200 stated supra.

Figure 4:
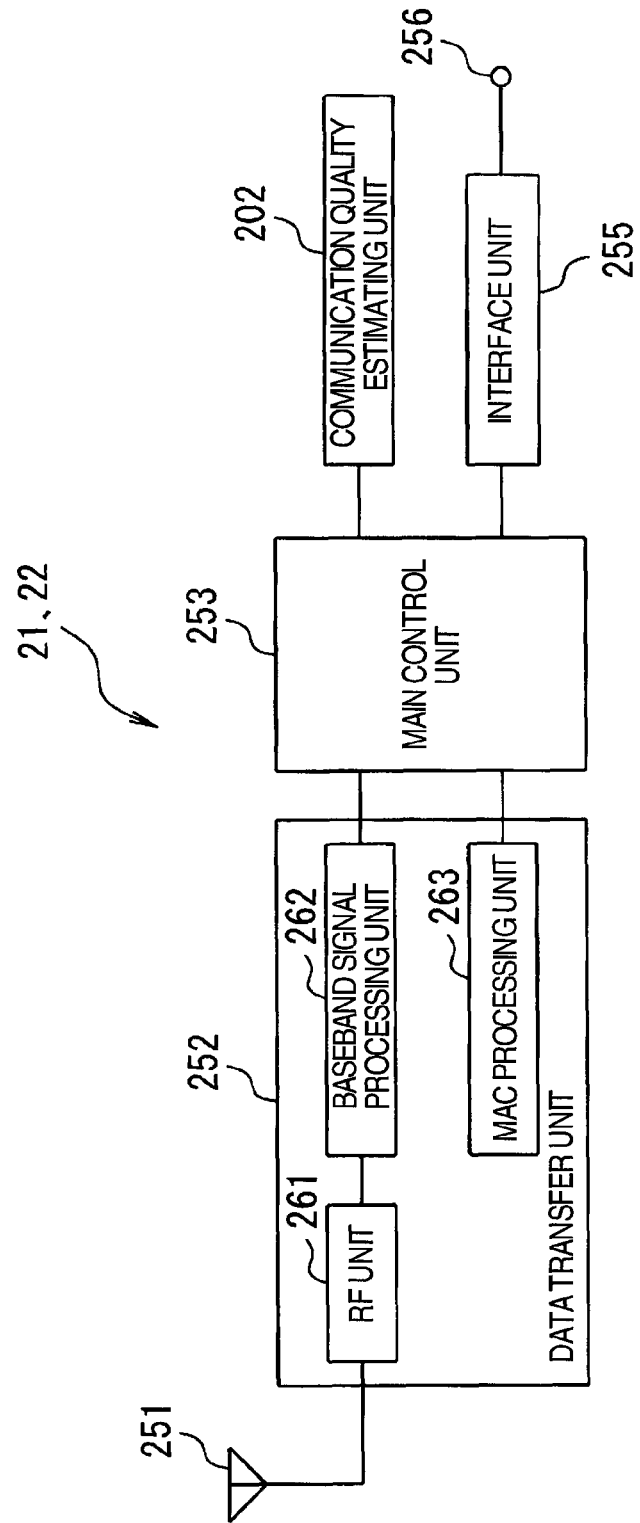
FIG. 4 is a diagram showing configuration of a wireless communication terminal, such as customer premises equipment (CPE) 21, 22, in the wireless communication system.

As shown in FIG. 4, the CPE 21, 22 includes an antenna 251 for transmission and reception of radio waves, a data transfer unit (DTU) 252 which performs data transmission and reception, a main control unit 253 which performs control of an entirety of this equipment, a communication quality estimating unit 202 which estimates communication quality at the time of receiving a signal from BS 10, an interface unit 255 functioning to interface the CPE with external telecommunication lines and external devices, and a terminal 256 for connection with external lines and external devices.

The DTU 252 has an RF unit 261, baseband (BB) signal processing unit 262 and MAC processing unit 263.

The RF unit 261 performs processing operations, such as frequency conversion of uplink and downlink signal from baseband to RF bandwidth and vice versa, and signal amplification, etc.

The BB signal processor 262 performs operations including ECC encoding/decoding and modulation/demodulation (modem) processing.

The MAC processor 263 performs processing operations including timing control of data transmission/reception and a frequency channel to be used by its own equipment 21, 22, adding this equipment's identifier to packets, and recognition of a wireless device which acting as the data transmission source.

Additionally, the above-stated functions of the signal receiving unit 201, communication quality information transmission unit 203 and required quality transmission unit 204 are realized by letting the DTU 252 transmit and receive various kinds of signals and data via Tx/Rx antenna 251 under control of the main control unit 253.

Note here that the main control unit 253 is configurable, for example, by software and data storage areas defined on a micro-processor unit (MPU) and memory. The processing functions of BB signal processor 262, MAC processor 263 and communication quality estimating unit 202 are realizable, for example, by the MPU of main control unit 253 which reads a program being stored in data storage device, such as HDD, into the memory and then executes it.

(Operation of Radio Communication System)

Figure 5:
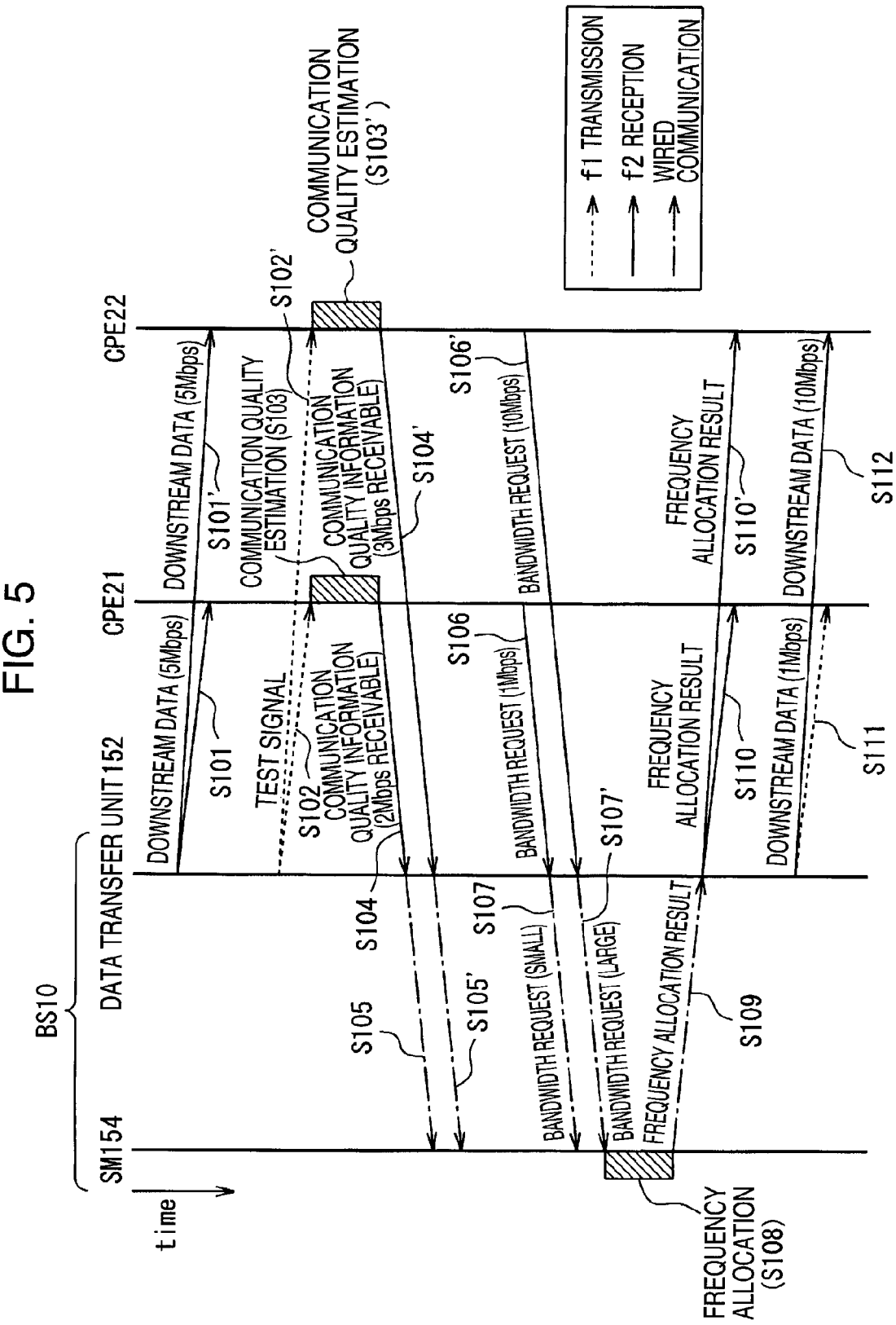
FIG. 5 is a diagram showing one example of a processing operation in the wireless communication system.

An operation of the wireless communication system in accordance with this embodiment will be described below. FIG. 5 is a sequence diagram showing one example of the processing in the wireless communication system 1. This example assumes that the system is in its initial state in which the SM 154 recognizes, from a usable frequency list acquired by access to a database on IP network, that the CPE 21 is capable of transmitting data only at a frequency f2 whereas CPE 22 is able to transmit data at both of frequencies f1 and f2.

It is also assumed that in this example, bidirectional communication has already been established at the frequency f2. FIG. 5 shows a case where the CPE 21 and CPE 22 receive downstream data from BS 10 at a data rate of 5 megabits per second (Mbps), respectively, while sharing the frequency f2 together (at step S101 and step S101'). More specifically, at the frequency f2, each of the CPE 21 and CPE 22 is able to receive downstream data of at least 10 Mbps if they communicate without sharing the frequency. This information (referred to hereinafter as "information A") is held in the SM 154 (communication quality information memory unit 101) of BS 10. Note here that in this embodiment, the direction of data transmission from BS 10 to CPE 21 or CPE 22 will be referred to as "down" whereas the direction of data transmission from CPE 21 or CPE 22 to BS 10 will be called the "up."

First of all, the BS 10 periodically transmits to the CPE 21, 22 a couple of test signals having frequencies f1 and f2, here f1 is a candidate channel for use. In other words, the signal receiving units 201 of CPEs 21 and 22 are expected to receive these test signals at prespecified time intervals. Although FIG. 5 depicts only the case where the test signal of frequency f2 is transmitted, the test signal of frequency f1 is also periodically transmitted in a similar way (at step S102, step S102').

The test signal-received communication quality estimator units 202 of CPEs 21 and 22 estimate the communication quality of the frequency f1, respectively (at step S103, step S103'). After having performed the communication quality estimation, the communication quality information transmission units 203 of CPEs 21-22 send to BS 10 the communication quality information indicative of their estimation results (step S104, step S104'). In this transmission event, the frequency f2 is used, at which data communication has already been established.

Note that in this example, there is transmitted the communication quality information which indicates the fact that the CPE 21 is able to receive a "down" signal(s) with the frequency f1 at 2 Mbps whereas CPE 22 can receive downstream-signals of frequency f1 at 3 Mbps. Also note that although in this example the case of time division multiple access (TDMA) is shown as an example of the case of notifying the BS 10 of the communication quality of CPEs 21-22, this should not be construed as limiting the invention. Other schemes may alternatively be employed, example of which include the frequency division multiple access (FDMA) and code division multiple access (CDMA).

The DTU 152 of BS 10 receives the communication quality information and sends it to the SM 154 via an internal data transfer line (wired communication line) of BS 10 (at step S105, step S105'). The DTU 152 simultaneously sends to SM 154 the information notifying that this communication quality information is for the frequency f1 in view of the fact that the test signal of frequency f1 was sent at step S102, S102'.

The communication quality information memory unit 101 of SM 154 stores and retains therein the transmitted communication quality information along with respective identifiers of CPEs 21-22 and data indicating that this communication quality information is for the frequency f1. For example, additional information (referred to hereinafter as "information B") is prepared which involves a first group consisting of an identifier="001" (identifier of CPE 21), frequency="f1" and communication quality information="2 Mbps" and a second group consisting of an identifier="002" (identifier of CPE 22), frequency="f1" and communication quality information="3 Mbps," wherein the information B is saved in the storage device, such as HDD or else, in the form of a database.

Suppose that thereafter, CPEs 21 and 22 generate communication requests, followed by issuance of CPE 21's frequency bandwidth request of 1 Mbps or greater and CPE 22's bandwidth request of 10 Mbps or more from the required quality transmission unit 204. At this time, each CPE sends its bandwidth request to BS 10 by any one of the TDMA, FDMA and CDMA schemes (at step S106, step S106'). Note here that FIG. 5 shows an example of frequency bandwidth request by TDMA.

The DTU 152 of BS 10 (required quality receiving unit 102) receives each frequency bandwidth request and sends it to the SM 154 (at step S107, step S107'). The frequency allocation processing unit 103 of SM 154 performs frequency allocation processing in response to each bandwidth request (at step S108).

More precisely, first, reference is made to the information B that is the frequency f1-related communication quality information being held by the communication quality information memory unit 101. In this example the CPE 21 issues a request for the use of a communication bandwidth of 1 Mbps or higher whereas CPE 22 requests the use of a frequency bandwidth of 10 Mbps or more. At this time, according to the information B, the CPE 21 is able to perform 2 Mbps-communication at the frequency f1 so that its request is satisfiable; however, CPE 22's request is not satisfiable because this CPE is merely able to perform communication of 3 Mbps at the frequency f1. On the other hand, according to the information A that is the communication quality information relating to the frequency f2, CPE 22 is capable of receiving data at 10 Mbps if the frequency f2 is set therefor; so, it is possible to satisfy the request. Accordingly, in this case, the frequency f1 is allocated to CPE 21, and the frequency f2 is assigned to CPE 22.

The SM 154 transmits this frequency allocation processing result to the DTU 152 by internal wired communication of the "self" station in which SM 154 is disposed (at step S109).

Then, the DTU 152 of BS 10 (allocation result transmitting unit 104) transmits this frequency allocation result to CPE 21 and CPE 22 by using the currently communication-established frequency f2 (at step S110, step S110'). Thereafter, real communication gets started. More specifically, the downstream communication of from BS 10 to CPE 21 is carried out at the frequency f1 (at step S111); the downstream communication of from BS 10 to CPE 22 is performed at frequency f2 (step S112).

As apparent from the foregoing, this example is such that the frequency f1 is allocated to the downstream communication of CPE 21 whereas the frequency f2 is assigned to the downstream communication of CPE 22. This makes it possible to allocate the frequency f1 with less communication quality to the downstream communication of CPE 21 which is small in bandwidth request and allocate the frequency f2 with better communication quality to the downstream communication of CPE 22 that is large in bandwidth request, thereby enabling satisfaction of bandwidth requests of the both CPEs at a time.

Although only the downstream communication frequency allocation is shown in FIG. 5, it is also possible by using a similar technique to effectively perform frequency allocation of upstream communication. More specifically, a test signal is sent from CPE 21 (CPE 22) to BS 10, which performs communication quality estimation processing. Then, its estimation result is held in the communication quality information memory unit 101 of SM 154, followed by notification of a frequency allocation result from BS 10 to CPE 21 (CPE 22) in the event of performing upstream-communication. Thereafter, data transmission of from CPE 21 (CPE 22) to BS 10 gets started.

Another method is also employable for permitting the CPE to play a major role in the process of determining the frequency allocation. More precisely, a test signal is sent from CPE 21 (CPE 22) to BS 10, which performs communication quality estimation processing. Then, communication quality information is sent from BS 10 to CPE 21 (CPE 22). Then, in the case of performing data transmission from CPE 21 (CPE 22) to BS 10, a frequency bandwidth request is issued and sent from BS 10 to CPE 21 (CPE 22). Additionally, CPE 21 (CPE 22) performs frequency allocation processing, a result of which is sent to BS 10. Thereafter, data transmission of from CPE 21 (CPE 22) to BS 10 gets started.

(Other Examples of Frequency Allocation)

Figure 6:
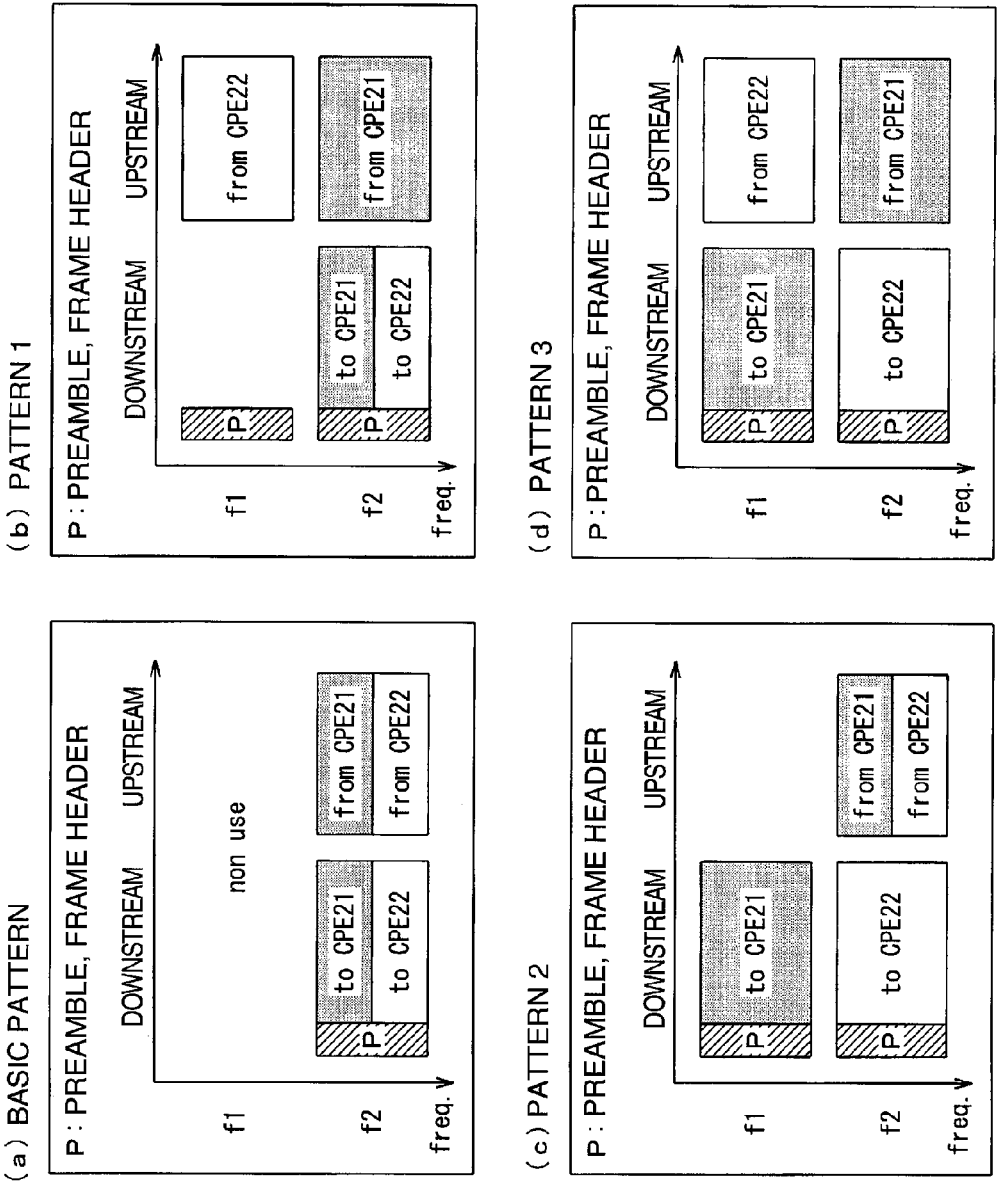
FIG. 6 is a diagram showing examples of frequency allocation patterns.

FIG. 6 shows other operative examples of the frequency allocation pattern used in this embodiment. In the wireless communication system 1, several frequency allocation patterns such as shown in FIGS. 6(a) to 6(d) are employable as an alternative to the example of FIG. 5.

A basic pattern shown in FIG. 6(a) is a frequency allocation pattern that is also employed in prior known bidirectional wireless communication systems of the type using whitespaces. The basic pattern of FIG. 6(a) is for execution of TDD communication using the frequency f2 in upstream/downstream-communications between the BS 10 and CPE 21 or CPE 22. In this embodiment also, only the frequency f1 is licensed in the incumbent system 2; so, each of the BS 10 and CPEs 21-22 of wireless communication system 1 is capable of using the frequency f2 for data transmission with a large amount of electric power. Thus, the frequency allocation of the basic pattern of FIG. 6(a) is also employable in the wireless communication system of this embodiment.

However, frequency allocation patterns of FIGS. 6(b) to 6(d) to be described below are those employable only in the wireless communication system of this embodiment.

In a frequency allocation method of the pattern 1 shown in FIG. 6(b), the frequency f2 is used for downstream-communications of from BS 10 to both of CPE 21 and CPE 22. The frequency f2 is used for upstream-communication of from CPE 21 to BS 10; the frequency f1 is used for upstream-communication of from CPE 22 to BS 10.

In downstream-communication from BS 10, a preamble and frame header P may also be designed to be sent by using the frequency f1. A reason of this is as follows. In view of the fact that the preamble and frame header are signals to be sent by BS and are important signals for use in transfer of frame sync and frame configuration, highly reachable modulation schemes and coding techniques are typically used so that the intended communication is still attainable even in the case of low-power transmission. This makes it possible to utilize usable frequency resources more effectively.

In a frequency allocation method of a pattern 2 of FIG. 6(c), the frequency f1 is used for downstream-communication of from BS 10 to CPE 21 whereas the frequency f2 is used for downstream-communication of from BS 10 to CPE 22. The frequency f2 is used for upstream-communications of from both of CPE 21 and CPE 22 to BS 10.

In a frequency allocation method of a pattern 3 of FIG. 6(d), different frequencies are used for CPE 21 and CPE 22 which operate to communicate with BS 10. The frequency f1 is used for downstream-communication of from BS 10 to CPE 21 and also for upstream-communication of from CPE 22 to BS 10. The frequency f2 is used for downstream-communication of from BS 10 to CPE 22 and upstream-communication of from CPE 21 to BSS 10.

More specifically, as shown in FIG. 6, it is possible for the wireless communication system of this embodiment to employ not only the basic pattern but also other frequency allocation schemes, including the patterns 1 to 3. In other words, when compared to prior art two-way wireless communication systems, it is possible to utilize usable frequencies effectively, thereby making it possible to perform frequency allocation with enhanced efficiency. On the contrary, in the case of wireless communication schemes defined by conventional IEEE 802.22 specifications, communication is done by TDD; and, unlike the wireless communication system of this embodiment, SM does not perform the communication quality management. Thus, its employable frequency allocation method is limited only to that using the basic pattern. For this reason, what it can do is merely to permit the CPE 21 and CPE 22 to share the frequency f2 in downstream-communication events. This will be encountered, in some cases, with the risk of inability to satisfy bandwidth requests of all communication terminals concerned.

It is noted here that the illustrative whitespace-use wireless communication system performs two-way communications using either TDD or half-frequency division duplex (H-FDD) and, in addition thereto, has communication functionalities based on frequency division duplex (FDD). Thus it is possible to use different frequencies between two opposite communication directions.

(Sum-Up)

It has been stated that the whitespace-use wireless communication system in accordance with the illustrative embodiment of this invention enables active use of a one-way link, thereby improving the frequency use efficiency and thus making it possible to achieve effective use of frequency resources of the whole system. Furthermore, it becomes possible to effectively perform, based on communication quality, frequency allocation for each direction of two-way communications.

Note that the wireless communication system in accordance with this embodiment is especially adaptable for use in IEEE 802.22 standard-compliant wireless communication systems, although this is not to be construed as limiting the invention.

Also note that the coverage and scope of this invention should not be limited only to exemplary embodiments and may involve all possible embodiments which attain the object of this invention and yield equivalent effects and advantages. Furthermore, the scope of this invention is definable by any desired combinations having one or more specific features chosen from all of respective features as disclosed herein.

(Additional Statements)

As apparent from the detailed description of embodiments of this invention, a part or entirety of the above-stated embodiment may also be set forth in a manner of each of additional statements to be given below. However, each additional statement is mere exemplification of this invention, and this invention should not be interpreted to be limited only to such case.

(Additional Statement 1)

A wireless communication system including a transmitting station operative to transmit data by wireless communication and a receiving station operative to receive the data, for performing the wireless communication by using a whitespace, characterized in that the receiving station comprises:

a communication quality estimating unit for detecting possibility of data reception at a specific frequency;

a communication quality information transmission unit for transmitting to the transmitting station communication quality information which is a detection result of the communication quality estimating unit; and a required quality transmission unit for transmitting, upon start-up of data reception by the wireless communication, required quality which is a condition for the data reception to the transmitting station, and that the transmitting station comprises:

a communication quality information retention unit for receiving and retaining therein the communication quality information;

a required quality reception unit for receiving the required quality from the receiving station;

a frequency allocation processing unit for determining a frequency satisfying the required quality by reference to the communication quality information and for allocating this frequency as a frequency used for data transmission to the receiving station; and an allocation result transmission unit for transmitting to the receiving station an allocation result obtained at the frequency allocation processing unit.

With this arrangement, it becomes possible in the whitespace-use wireless communication system to use one-way link, thereby improving the frequency use efficiency. This makes it possible to achieve effective utilization of frequency resources of an entirety of the system.

(Additional Statement 2)

A wireless communication system as recited in additional statement 1, characterized in that the communication quality estimating unit estimates communication quality upon receipt of data at the specific frequency and that the communication quality information transmission unit transmits as the communication quality information a judgment result at the communication quality estimating unit.

With this arrangement, it becomes possible in the whitespace-use wireless communication system to use a one-way link, thereby improving the frequency use efficiency. This makes it possible to achieve effective utilization of frequencies of the whole system.

(Additional Statement 3)

A wireless communication system as recited in additional statement 1 or 2, characterized in that the receiving station further comprises a signal reception unit which receives a signal used for determining whether data is receivable at the specific frequency, and that the communication quality estimating unit uses the signal received by the signal reception unit to detect data receivability at the specific frequency.

With this arrangement, it becomes possible in the whitespace-use wireless communication system to use a one-way link, thereby improving the frequency use efficiency. This makes it possible to achieve effective utilization of frequencies of the whole system.

(Additional Statement 4)

A wireless communication system as recited in any one of the additional statements 1 to 3, characterized in that the communication quality information is indicative of a maximum data rate with data receivability at the specific frequency, and that the required quality indicates a demanded data rate responding to a traffic during data reception by the wireless communication.

With this arrangement, it becomes possible in the whitespace-use wireless communication system to use a one-way link which satisfies a communication frequency bandwidth request, thereby improving the frequency use efficiency. This makes it possible to achieve effective utilization of frequencies of the whole system.

(Additional Statement 5)

A frequency allocation method for allowing a transmitting station which sends data by wireless communication and a receiving station which receives the data to perform the aforesaid wireless communication by utilizing a whitespace, the method comprising:

a first step of letting the receiving station detect data receivability at a specific frequency;

a second step of letting the receiving station send communication quality information which is a detection result at the first step to the transmitting station;

a third step of letting the transmitting station receive the communication quality information and retain it therein;

a fourth step of letting the receiving station be responsive to start-up of data reception by the wireless communication for transmitting, to the transmitting station, required quality being a condition for reception of the data;

a fifth step of letting the transmitting station receive the required quality from the receiving station;

a sixth step of letting the transmitting station select a frequency satisfying the required quality by reference to the communication quality information and allocate the frequency as a frequency for use in data transmission to the receiving station; and a seventh step of letting the transmitting station send a result of allocation at the sixth step to the receiving station.

With this arrangement, it becomes possible in the whitespace-use wireless communication system to use a one-way link, thereby improving the frequency use efficiency. This makes it possible to achieve effective utilization of frequencies of the whole system.

What is claimed is:

1. A wireless communication system for performing wireless bidirectional communication under a Time Division Duplex (TDD) mode using at least a first frequency of whitespace, comprising:
   a transmitting station configured to transmit data by wireless communication; and
   at least two receiving station configured to receive the data;
   wherein each of the at least two receiving stations include:
      a signal receiving unit configured to receive a specific signal transmitted by the transmitting station at least at a second frequency which is in whitespace at a site of the transmitting station and not in the whitespace at the site of one of the at least two receiving stations,
      a downstream quality estimating unit configured to estimate, from the specific signal received by the signal receiving unit, a possibility of data reception at the second frequency,
      a quality information transmission unit configured to transmit to the transmitting station through a first frequency a downstream quality information which is an estimation result of the downstream quality estimating unit, and
      a required quality transmission unit configured to transmit, in response to start-up of data reception by the receiving station, requiring quality for data reception which indicates a requiring data rate depending on traffic, to the transmitting station through the first frequency; and
   wherein the transmitting station includes:
      a quality information memory unit configured to receive and retain each of the downstream quality information along with an identifier of the receiving station and a frequency used for downstream quality estimation,
      a required quality receiving unit configured to receive a required quality from the receiving station,
      a frequency allocation processing unit configured to determine frequency from the first and second frequency satisfying the required quality by reference to the downstream quality information and allocating the determined frequency for data transmission to the corresponding receiving station; and
      an allocation result transmitting unit configured to transmit to the receiving station an allocation result obtained at the frequency allocation processing unit.

2. The wireless communication system of claim 1,
wherein at the second frequency, the transmitting station is further configured to transmits a preamble, a frameheader of TDD frame, and downstream data so that the second frequency is only used in downstream for data as a one-way link, and
wherein the downstream quality information transmission unit is further configured to transmits as the downstream quality information a set of communication-capable maximum data rate, Signal to Interference and Noise Power Rate (SINR), Bit Error Rate (BER) or Packet Error Rate (PER) in an event of receiving data through the second frequency and an information of the second frequency from which the communication quality information was obtained at the downstream quality estimating unit.

3. The wireless communication system of claim 1,
wherein the transmitting station further includes:
   an up-stream quality estimator configured to estimate, from the specific signal transmitted by the at least two receiving stations, upstream quality of data reception through the second frequency, and
   a spectrum manager configured to:
      acquires a usable frequency list by accessing a database on an IP network,
      retains each estimation result by the up-stream quality estimator, and
      manages usable frequencies for the at least two receiving stations;
wherein the transmitting station, at the second frequency, is further configured to:
   transmit a preamble and a frameheader of TDD frame in highly reachable modulation schemes or coding techniques rather than those used for downstream data, and
   receives upstream data so that the second frequency is only used in upstream for data as a one-way link; and
wherein the downstream quality information includes a set of communication-capable maximum data rate, SINR, BER or PER in an event of receiving data at the second frequency and an information of the second frequency.

4. The wireless communication system of claim 1,
wherein the transmitting station further includes:
an up-stream quality estimator configured to estimate, from the specific signal transmitted by the at least two receiving stations, upstream quality of data reception through the second frequency, and
a spectrum manager configured to:
acquires a usable frequency list by accessing to a database on IP network,
retains each estimation result by the up-stream quality estimator, and
manages usable frequencies for the at least two receiving stations;
wherein the transmitting station, at the second frequency, is further configured to:
transmits a preamble, a frame header and downstream data to one of the at least two receiving stations except an another receiving station,
receives upstream data from the another receiving station, meanwhile, at the first frequency, transmits a preamble, a frame header and downstream data to the another receiving station except the one of the at least two receiving stations, and
receives upstream data from the one of the at least two receiving stations so that the first and second frequency is used in a half-frequency division duplex scheme; and
wherein the downstream quality information includes a set of communication-capable maximum data rate, SINR, BER or PER in an event of receiving data at the second frequency and an information of the second frequency.

5. The wireless communication system of claim 2,
wherein the signal receiving unit is further configured to receives each specific signal transmitted periodically by the transmitting station in both of the first and second frequency; and
wherein the transmitting station is further configured to transmits the preamble and frame header in highly reachable modulation schemes or coding techniques rather than downstream data.

6. The wireless communication system of claim 2,
wherein the second frequency of the one-way link is bound to the first frequency used under a TDD modes; and
wherein the transmitting station is further configured to:
accesses a database to acquire a usable frequency list,
choose the second frequency from frequencies partially available among a plurality of terminals, and
transmits periodically specific signals for the estimation through the first and the second frequency.

7. The wireless communication system of claim 3,
wherein the second frequency of the one-way link is bound to the first frequency used under TDD mode, and
wherein the transmitting station is further configured to:
choose the second frequency from frequencies partially available among a plurality of terminals, and
transmits periodically the specific signals for the estimation through the first and the second frequency.

8. The wireless communication system of claim 4,
wherein the first and the second frequency used as one-way link for specific one of the receiving stations are bound together, and
wherein the transmitting station is further configured to:
choose the second frequency from frequencies partially available among the terminals and
transmits periodically the specific signals for the estimation through the first and the second frequency.

9. A frequency allocation method for TDD-based wireless communication between a base station and at least two terminals through at least a first frequency of a whitespace, comprising:
detecting, by at least two terminals, a receivability of downstream data from a base station through a first frequency and a second frequency of a whitespace at a site of one of the at least two terminals, wherein the second frequency is not whitespace at the site of the one of the at least two terminals;
sending, by the at least two terminals, information of downstream quality of the first frequency and the second frequency which is a detection result of the detecting to the base station through the first frequency;
receiving, by the base station, the information of downstream quality and retaining the information along with an identifier of the at least two terminals and a frequency in which the detection result was obtained;
transmitting, by the at least two terminals, a required quality for reception of the downstream data before the reception of the downstream data;
receiving, by the base station, the required quality from a respective terminal of the at least two terminals;
selecting, by the base station, at least one frequency satisfying the required quality by reference to the information of downstream quality and allocating the one frequency as a frequency for use in data transmission to the respective terminal;
sending, by the base station, an allocation result of the allocating to the respective terminal,
accessing, by the base station, a database to acquire a list of usable frequencies; and
transmitting, by the base station, periodically specific signals for the detection result of the detecting through the first and the second frequency, wherein the second frequency is chosen from frequencies outside whitespace at a site of one terminal and available for another terminal;
wherein in accordance with the allocation result, the base station and at least one terminal configure a one-way link in the first frequency or the second frequency.

10. The frequency allocation method of claim 9, wherein a frequency of the one-way link is bound to another frequency used under a TDD mode.

11. A frequency allocation method for TDD-based wireless communication through at least a first frequency of a whitespace, comprising:
receiving, by a base station, information of downstream quality of the first frequency and the second frequency and retaining the information along with an identifier of at least two terminals that sent the information of the downstream quality and a frequency of which a detection result was obtained by the at least two terminals;
transmitting, by the at least two terminals, a required quality for reception of the downstream data before the reception of the downstream data;
receiving, by the base station, a required quality for reception of the downstream data before the reception of the downstream data from a respective terminal of the at least two terminals;
selecting, by the base station, at least one frequency satisfying the required quality by reference to the information of downstream quality and allocating the one frequency as a frequency for use in data transmission to the respective terminal;

sending, by the base station, an allocation result of the allocating to the respective terminal, accessing, by the base station, a database to acquire a list of usable frequencies; and transmitting, by the base station, periodically specific signals for the detection result of the detecting through the first and the second frequency, wherein the second frequency is chosen from frequencies outside whitespace at a site of one terminal and available for another terminal;

wherein in accordance with the allocation result, configuring by at least the base station a one-way link in the first frequency or the second frequency.

12. A frequency allocation method for TDD-based wireless communication through at least a first frequency of a whitespace, comprising:

detecting, by at least two terminals, a receivability of downstream data from a base station through a first frequency and a second frequency of a whitespace at a site of one of the at least two terminals, wherein the second frequency is not whitespace at the site of the one of the at least two terminals;

sending, by the at least two terminals, information of downstream quality of the first frequency and the second frequency which is a detection result of the detecting to the base station through the first frequency; and transmitting, by the at least two terminals, a required quality for reception of the downstream data before the reception of the downstream data;

wherein the base station is configured to:

receive the information of the downstream quality of the first frequency and the second frequency, retain the information therein along with an identifier of the at least two terminals and a frequency in which the detection result at the first step has was obtained, receive, by the base station, a required quality for reception of the downstream data before the reception of the downstream data from a respective terminal of the at least two terminals, select at least one frequency satisfying the required quality by reference to the information of downstream quality and allocating the one frequency as a frequency for use in data transmission to the respective terminal, send an allocation result of the allocating to the respective terminal, access a database to acquire a list of usable frequencies, and transmit periodically specific signals for the detection result of the detecting through the first and the second frequency, wherein the second frequency is chosen from frequencies outside whitespace at a site of one terminal and available for another terminal; and wherein, in accordance with the allocation result, configuring by at least one terminal a one-way link in the first frequency or the second frequency.

* * * * *